United States Patent
Chiles et al.

(10) Patent No.: US 6,726,115 B1
(45) Date of Patent: Apr. 27, 2004

(54) RADIANT HEATING SYSTEM FOR SUBFLOOR INSTALLATION

(75) Inventors: Daniel T. Chiles, Springfield, MO (US); Michael S. Gehrke, Marshfield, MO (US); Richard M. Chiles, Springfield, MO (US)

(73) Assignee: Watts Radiant, Inc., Springfield, MO (US)

( * ) Notice: Subject to any disclaimer, the term of this patent is extended or adjusted under 35 U.S.C. 154(b) by 0 days.

(21) Appl. No.: 10/341,045

(22) Filed: Jan. 13, 2003

(51) Int. Cl.[7] ................................................. F24D 5/10
(52) U.S. Cl. .............................. 237/69; 165/49; 165/56
(58) Field of Search ..................... 237/69, 43; 454/185; 165/56, 49, 171

(56) References Cited

U.S. PATENT DOCUMENTS

| | | |
|---|---|---|
| 3,366,170 A | 1/1968 | Welz |
| 4,058,982 A * | 11/1977 | Wright ........................ 405/211 |
| 4,508,162 A * | 4/1985 | Radtke ......................... 165/56 |
| H239 H * | 3/1987 | Franklin et al. .............. 165/47 |
| 4,865,120 A | 9/1989 | Shiroki |
| 5,131,458 A | 7/1992 | Bourne et al. |
| 5,327,737 A | 7/1994 | Eggemar |
| 5,454,428 A | 10/1995 | Pickard |
| 5,579,996 A | 12/1996 | Fiedrich |
| 5,788,152 A | 8/1998 | Alsberg |
| 5,799,723 A | 9/1998 | Sokolean |
| 5,810,075 A | 9/1998 | Deeke et al. |
| 5,879,491 A * | 3/1999 | Kobayashi ................... 156/71 |
| 5,957,378 A | 9/1999 | Fiedrich |
| 6,263,963 B1 * | 7/2001 | Tippmann et al. .......... 165/171 |

* cited by examiner

*Primary Examiner*—Derek Boles
(74) *Attorney, Agent, or Firm*—Shook, Hardy & Bacon L.L.P.

(57) ABSTRACT

A radiant heating system for installation or a subfloor. Header panels having arcuate cutouts are secured on the subfloor near opposite walls of a room. Spaced apart sleepers are secured to extend between the header panels and provide channels that receive radiant heating tubing. The cutouts are initially occupied by break away header plates which can be detached to allow the tubing to curve through the cutouts so that it can extend between the ends of adjacent channels. The cutouts can be inserted back into the cutouts to secure the tubing bends in place. Heat conductive panels overlie the sleepers and channels and can be overlaid with finished flooring.

31 Claims, 3 Drawing Sheets

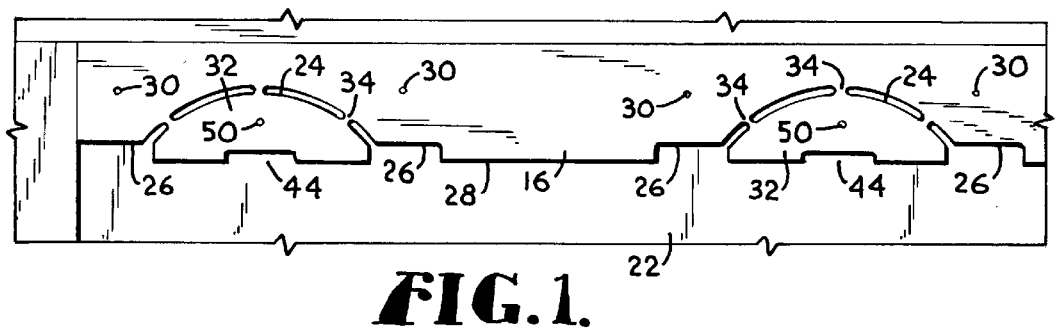
FIG. 1.
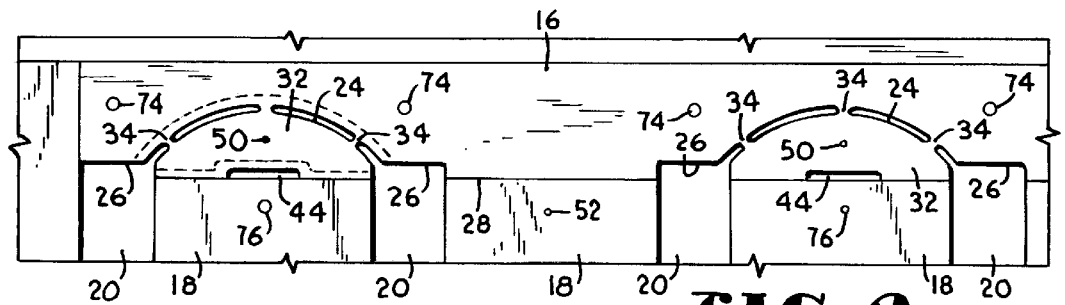
FIG. 2.
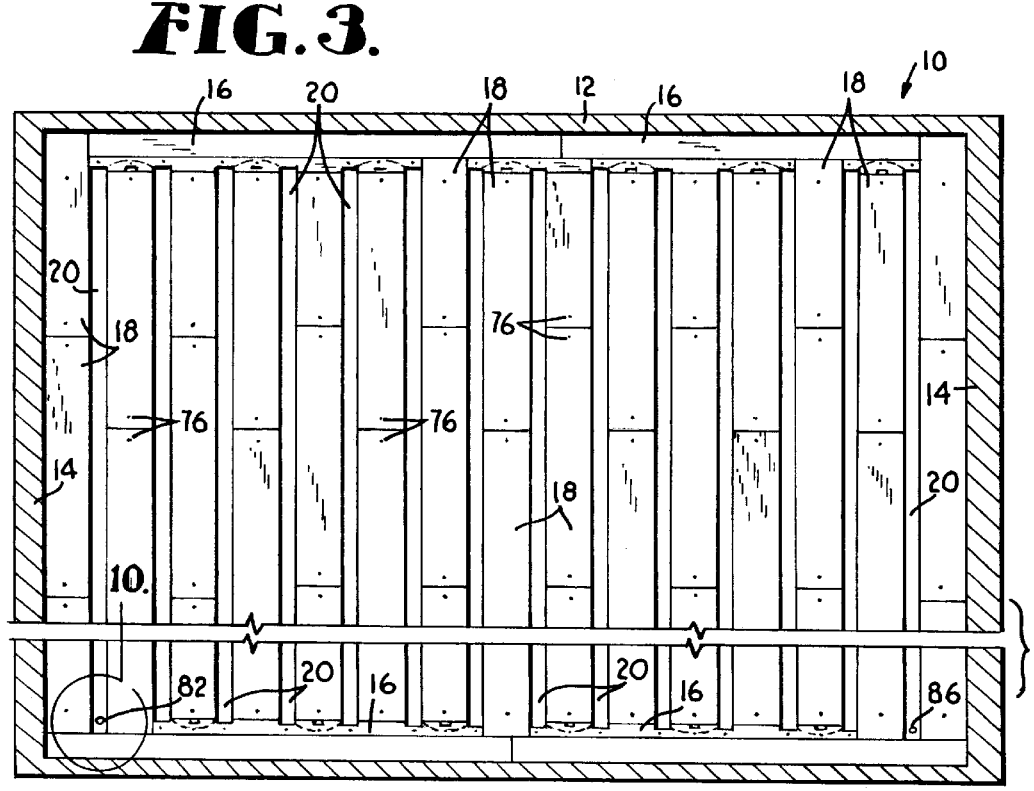

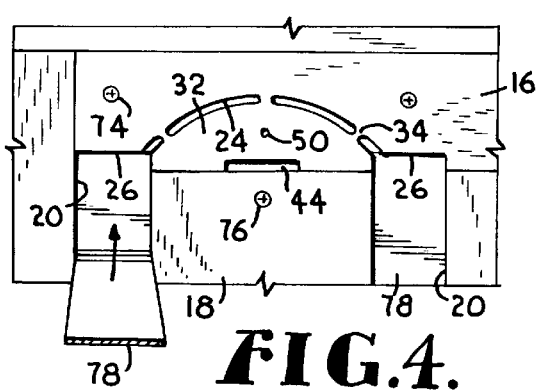
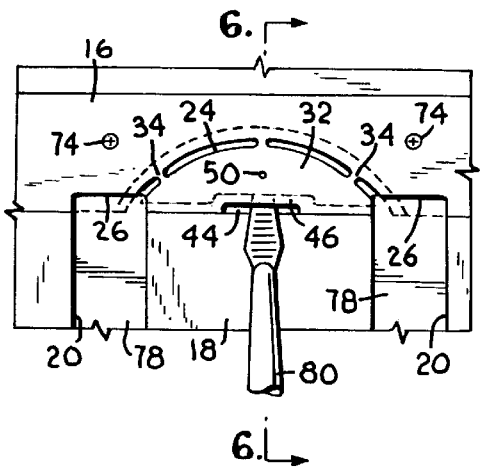
FIG.4.
FIG.5.
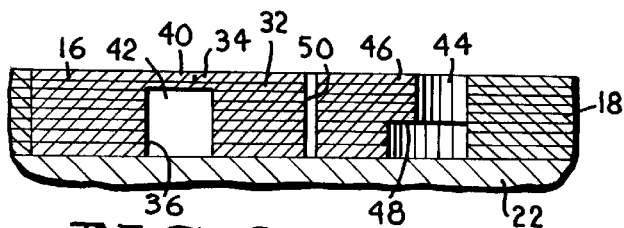
FIG.6.
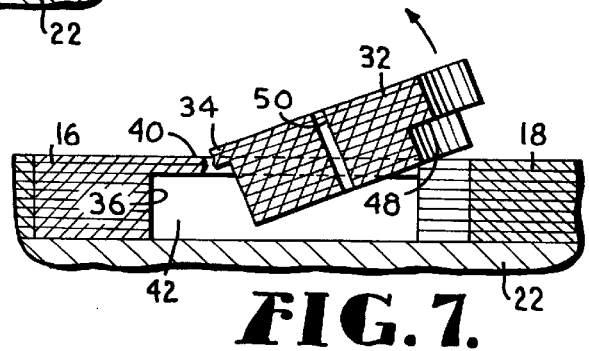
FIG.7.
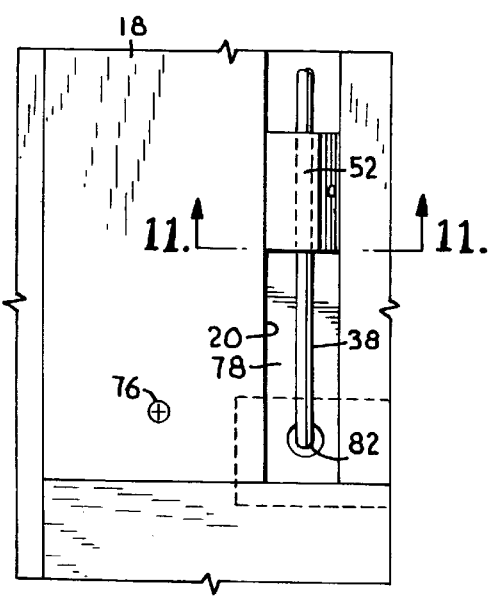
FIG.10.
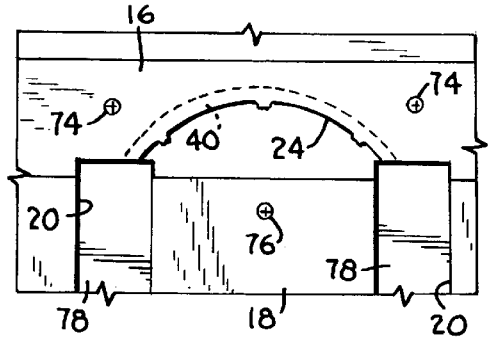
FIG.8.

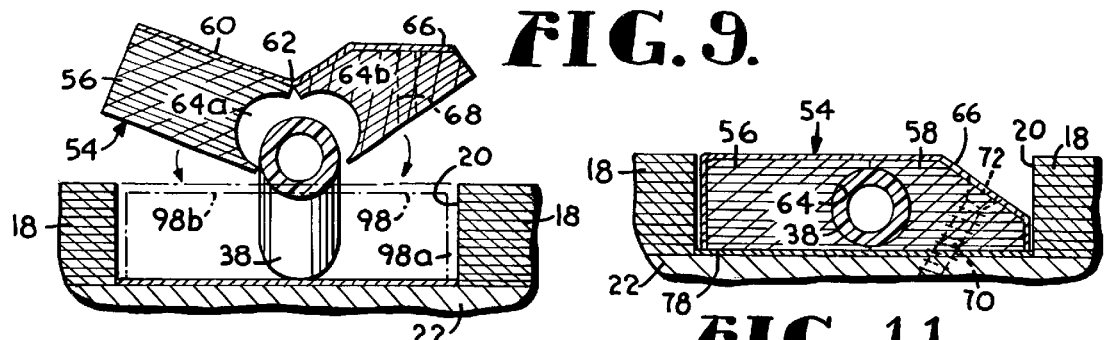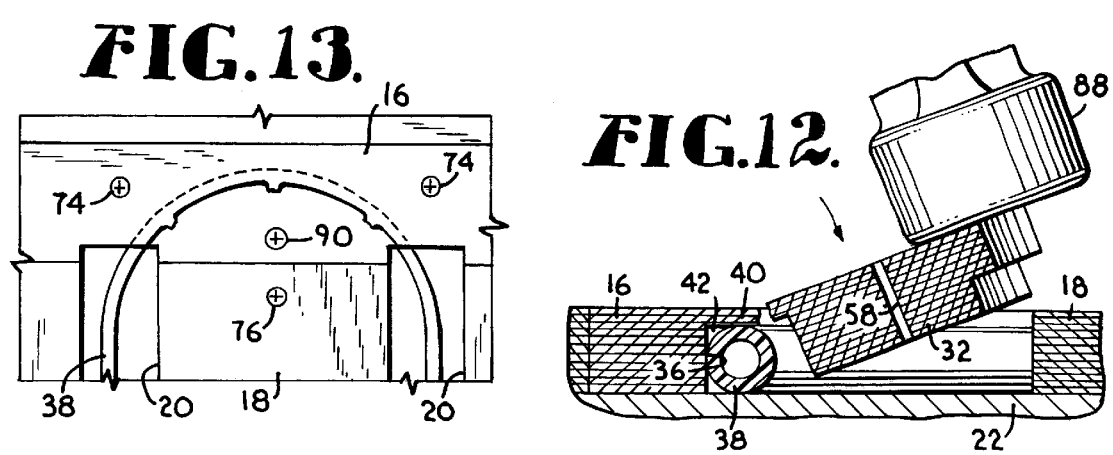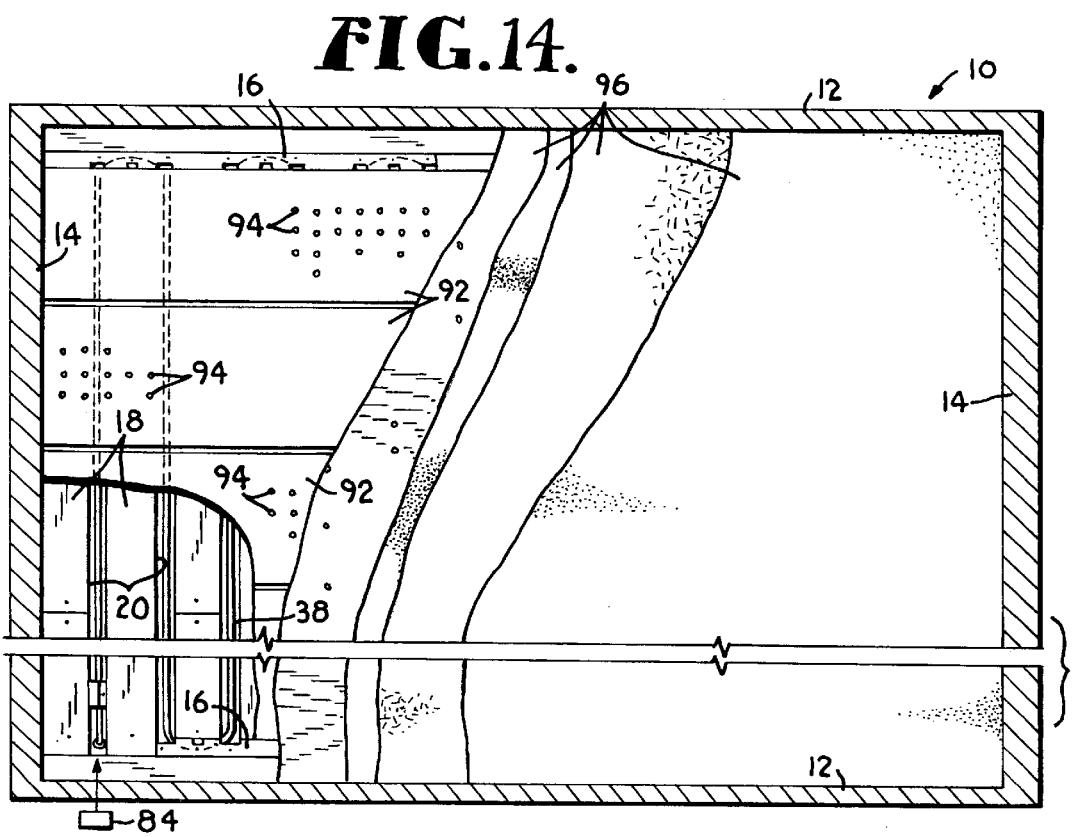

RADIANT HEATING SYSTEM FOR SUBFLOOR INSTALLATION

FIELD OF THE INVENTION

This invention relates in general to radiant heating systems using heated fluid which is pumped through radiant tubing extending in the floor area of the space that is to be heated. More particularly, the invention relates to a radiant heating system that is specifically constructed for installation on top of a subfloor and to a method of installing the system.

BACKGROUND OF THE INVENTION

Radiant heating has achieved considerable popularity for the heating of buildings. Traditionally, radiant heating tubing has been installed in concrete slabs, in thin slabs applied to frame floors, or under subflooring between the flooring joists. Heated fluid is pumped through the tubing and transmits heat to the floor area and in turn to the space above the floor. The types of tubing installations that have been used in the past are generally satisfactory. However, there are many instances when it is desirable to install a radiant system on an existing floor. This can create significant problems in that it can reduce the height of the room and can adversely affect many existing parts of the building, including toe space beneath cabinets, door clearance at the bottom, built-in appliances, and trim on the perimeter of the floor.

Wooden panels or composite insulation panels having grooves for accepting radiant tubing have been used as structural components in subfloors. However, the panels must retain adequate structural integrity, so the grooves cannot extend too deeply into the panels and the panels must be oriented so that the grooves are installed perpendicular to the structure supporting the floor joists. This can make the pipe layout very difficult and complex. A second type of non-structural panel is sometimes installed on top of a slab or structural wood subfloor. In addition, the outside diameter of the tubing is limited to the groove depth, and this limitation in the tubing size limits the flow rate. The transmission of warmth to the room is limited as well unless an expensive oversized pump is used to circulate fluid through the tubing.

Further, the tubing fits closely in the grooves so that it rubs against the sides of the grooves and creates an undesirable clicking rubbing noise whenever the tubing thermally expands as the system cycles. This noise problem can be severe. Also, some systems require adhesives, or silicon caulks to hold the tubing in the groove in an effort to alleviate the noise problem, and this significantly increases the cost and difficulty of the installation.

SUMMARY OF THE INVENTION

The present invention is directed to an improved radiant heating system that can be installed on an existing subfloor while minimizing the thickness that is required to be added on top of the subfloor. It is a particular feature of the invention that the entire thickness of the added sleeper members is available for the tubing, so the tubing diameter is maximized for efficiency in the transfer of warmth to the room that is being heated.

In accordance with the invention, two sides or ends of a room are provided with special wooden header panels that are constructed to accommodate curved bends in the radiant tubing. Spaced apart wooden sleepers are secured to the subfloor that run between the header panels. The sleepers provide parallel channels between them that receive straight runs of the radiant tubing. The channels are considerably wider than the tubing diameter so that the tubing can thermally expand and contract without rubbing against the sleepers and creating unwanted noise. The sleepers and channels are overlaid with heat conductive sheeting such as aluminum panels that have a clearance with the underlying tubing to avoid rubbing between the tubing and the sheeting.

The header panels have arcuate cutouts that are initially occupied by break away header plates that have the same shape as the cutouts. The header plates can be detached so that the tubing can be bent, inserted in the cutouts, and pressed against curved surfaces to provide curved paths for the radius bends of the tubing. Ledges projecting from the curved surfaces hold the bent tubing in place until the header plates can be inserted back into the cutouts and screwed to the subfloor. This permanently secures the tubing against the curved surfaces of the cutouts. The header plates have undercuts that allow them to be pried loose from the headers with a screw driver or other simple tool to facilitate their detachment from the header panels.

The invention is further characterized by the use of holding blocks that secure the tubing in place at strategic locations, where it would otherwise be dynamically stressed by thermal expansion and contraction, such as where the tubing emerges from the floor and where it extends back down through the floor. The holding blocks pivot closed on the tubing and fit closely in the channels. A beveled surface on each block has a predrilled hole that allows the block to be secured to the floor with the screw head recessed below the top surfaces of the sleepers and headers.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary top plan view of a header panel constructed for use in a radiant heating system according to a preferred embodiment of the present invention, with two header plates shown attached to the header panel and the header panel applied to the subfloor;

FIG. 2 is a fragmentary top plan view similar to FIG. 2, but showing the header panel attached to the subfloor by screws and also showing wooden sleepers applied to the subfloor;

FIG. 3 is a fragmentary top plan view showing a subfloor to which a plurality of header panels and a plurality of sleepers are applied and secured in accordance with a preferred embodiment of the present invention;

FIG. 4 is a fragmentary top plan view on an enlarged scale of a portion of one of the header panels and one of the sleepers and showing tape being applied to the subfloor at the bottoms of the grooves formed between adjacent sleepers;

FIG. 5 is a fragmentary sectional view similar to FIG. 4 showing a screw driver being used to pry a header plate away from a header panel;

FIG. 6 is a fragmentary sectional view on an enlarged scale taken generally along line 6—6 of FIG. 5 in the direction of the arrows;

FIG. 7 is a fragmentary sectional view similar to FIG. 6 showing the header plate being detached from the header panel;

FIG. 8 is a fragmentary top plan view similar to FIGS. 4 and 5 but showing the header plate detached from the header panel;

FIG. 9 is a fragmentary sectional view on an enlarged scale showing radiant tubing installed in one of the channels between adjacent sleepers and a holding block being applied to the radiant tubing, with the broken lines depicting a C-shaped cover installed in the channel to cover the tubing therein;

FIG. 10 is a fragmentary top plan view showing the tubing installed in one of the channels between the sleepers and secured by a holding block;

FIG. 11 is a fragmentary sectional view on an enlarged scale taken generally along line 11—11 of FIG. 10 in the direction of the arrows;

FIG. 12 is a fragmentary sectional view similar to FIG. 7, but showing a tubing bend installed in one of the cutouts in a header panel and the previously detached header plate being applied into the cutout of the header panel in order to secure the tubing in place;

FIG. 13 is a fragmentary top plan view showing a tubing bend installed in the cutout of a header plate and secured in place therein by a header plate secured in the header panel cutout and screwed to the subfloor; and FIG. 14 is a top plan view showing a radiant heating system installed on a subfloor according to a preferred embodiment of the present invention, with portions broken away for purposes of illustration.

Referring now to the drawings in more detail and initially to FIG. 3 in particular, the present invention is directed to a radiant heating system which may be installed on the subfloor of a room 10 having opposite side walls 12 and opposite end walls 14. In accordance with a preferred embodiment of the present invention, a plurality of header panels 16 are installed along each of the side walls 12. A plurality of sleeper panels 18 are installed on the subfloor and extend parallel to one another between the header panels 16 on the opposite sides of the room. The sleepers 18 are spaced apart to provide parallel grooves or channels 20 between the adjacent sets of sleepers 18.

The configuration of the header panels 16 is best shown in FIGS. 1 and 2. Each panel 16 is preferably constructed of wood and is more preferably constructed of a quality hardwood such as a high density multi-layer laminated plywood constructed of a suitable hardwood such as birch. The plywood construction provides dimensional stability in order to assure a level finished floor. In addition, plywood and hardwood products are well suited to holding screws and other fasteners used to secure them to the subfloor which is identified by numeral 22 in FIG. 1. The panels 16 may be ½ inch thick, although other thicknesses are possible.

Each panel 16 has a plurality of arcuate cutouts 24 which are spaced apart from one another along the edge of the panel that faces into the room. The edges of the cutouts 24 extend in an arcuate path and connect at their opposite ends with recesses 26 which are squared off at the corners and form the ends of the channels 20. A straight edge 28 extends between each adjacent pair of the recesses 28. Preferably, each of the panels 16 is provided with three of the arcuate cutouts 24, although a lesser or greater number of cutouts per panel is possible. Predrilled holes 30 are provided along the length of each panel 16 and may be located approximately midway along the width of the panel in line with the recesses 26. Each cutout 24 is initially occupied by and substantially filled by an arcuate header plate 32. Each header plate 32 is initially connected with the body of the panel 16 by a plurality of small necks 34. The necks 34 may be broken to detach the header plates 32 from header panels 16, as will be explained more fully.

With additional reference to FIG. 6, each cutout 24 is bounded by a curved guide surface 36 which provides a path for the extension of curved bend portions of radiant tubing 38 (see FIGS. 9–12). The surfaces 36 curve smoothly with a constant radius between the adjacent ends of the recesses 26 located on opposite sides of the cutout 24. A curved ledge 40 projects inwardly from the upper portion of each surface 36 to provide a curved groove 42 adjacent to surface 36 and beneath the ledge 40. The necks 34 extend from the edge of the ledge 40 to the adjacent curved edge of the header plate 32 in order to initially connect the header plate with the body of the header panel 16.

With continued reference to FIG. 6 in particular, the inwardly facing edge of each header plate 32 is provided at its center with a notch 44. A shoulder 46 projects from the upper portion of each notch 44 to provide on its underside a flat prying surface 48 which facilitates detachment of the header plate 32 from the header panel 16, as will be explained more fully. Each plate 32 is provided with a predrilled hole 50 for receiving a screw or similar fastener used to eventually secure the plate 32 in the cutout 24.

The sleepers 18 are preferably constructed of wood and more preferably of a high quality laminated plywood constructed of hardwood which may be the same as for the header panels 16. Each of the sleepers 18 is provided with a plurality of predrilled holes 52 for receiving screws or other fasteners used to secure the sleepers to the underlying subfloor 22. By way of example, the sleepers 18 may be six inches wide and approximately ½ inch thick and in any case should be approximately the same thickness as the header panels 16. The width dimension of the sleepers 18 should be the same as the length of the front edge of each header plate 32. The channels 20 are each approximately 2 inches in width in a preferred embodiment of the invention, although other widths are possible.

As will be explained more fully, the tubing 38 is installed in the channels 20. Between the channels, the tubing 38 is curved along the surfaces 36 provided within the cutouts 24 of the header panels 16. The tubing may be constructed of a suitable material that is able to accommodate a flow of heated fluid such as hot water and to transmit the heat through the tube wall to the adjacent materials. The outside diameter of the tubing is preferably slightly less than the thickness of the header panels 16 and sleepers 18.

The tubing may be secured within the channels 20 at one or more strategic locations by the use of one or more holding blocks 54 (see FIGS. 9–11). As best shown in FIG. 9, each holding block 54 is constructed in two sections 56 and 58 connected by a flexible tape 60 applied to the upper surfaces of the sections 56 and 58. The flexibility of the tape 60 allows the sections 56 and 58 to pivot relative to one another about a hinge axis 62 which is provided where the two sections meet one another at their upper surfaces. The two sections of block 60 can be pivoted about the hinge axis 62 between the open position shown in FIG. 9 and the closed position shown in FIG. 11. The facing edges of the two sections 56 and 58 are provided with mating semi-circular cavities 64a and 64b which, when the block 54 is in the closed position shown in FIG. 11, cooperate to provide a circular passage 64 that fits closely onto the outside surface of the tubing 38.

The block 54 has a width substantially equal to the width of the channel 20 so that the block can be closely fit within the groove in the manner shown in FIG. 11. The thickness of block 54 is substantially equal to the thickness of the sleepers 18. Section 58 of the block 54 has a beveled upper surface 66 that is provided with a predrilled hole 68. When the block is closed as shown in FIG. 11, the hole 68 extends at an angle due to the beveled orientation of surface 66, and a fastener such as a screw 70 can be applied through hole 68 and secured into the underlying subfloor 22 as shown in FIG. 1. The beveled configuration of surface 66 assures that the head 72 of screw 70 is recessed well below the level of the top surface of the sleepers 18.

The radiant heating system can be installed on the subfloor 22 in accordance with the present invention by first laying out the header panels 16 along or adjacent to the walls 12. The header panels 16 can then be secured to the subfloor 22 in the proper positions by installing screws 74 through the holes 30 and into the subfloor 22. Next, the sleepers 18 are laid out to extend between the header panels 16 that are adjacent to the opposite walls 12. The sleepers 18 are extended between the edges 28 of the sleeper panels and between the inwardly facing edges of the header plates 24, as best shown in FIG. 3. The sleepers 18 are spaced apart and parallel to one another to provide the channels 20 between each adjacent set of sleepers, with the channels 20 each having the same width. The sleepers 18 are then secured in place by applying screws 76 (FIG. 13) through the holes 52 and into the underlying subfloor 22.

With reference to FIG. 4, aluminized tape 78 or another type of material that is reflective to infrared radiation is applied to the base of each groove. Preferably, the tape 78 is provided with an adhesive on one side which is applied to the surface of the subfloor 22 at a location within the groove. The tape 78 preferably has the same width as the channels 20 so that it can easily be applied to provide the bottom surface of the entire length of each channel 20.

The detachable break away header plates 32 are then removed from the header panel 16 to which they are initially attached. As shown in FIG. 5, this can be done by inserting a prying tool such as a screw driver 80 into the notch 44 with the tip of the screw driver applied beneath the shoulder 46 and against the prying surface 48. The edge of the adjacent sleeper 18 can be used as a fulcrum to pry upwardly on surface 48 in a manner to break the thin necks 34, thereby detaching the header plate 32 from panel 16. Each of the plates 32 is detached in this manner.

The tubing 38 is then installed. The tubing 38 may be extended upwardly from below the subfloor 22 through an opening 82 (see FIG. 3) which may be located in the end of one of the channels 20 adjacent the wall 14 on one end of the room. The tubing 38 connects with a supply manifold 84 which receives a supply of heated fluid such as hot water which is applied by the manifold to the tubing 38 when the system is in operation.

The tubing 38 is extended along the length of the first channel 20 and is then curved back on itself through the adjacent cutout 24 and into the adjacent channel 20 along which the tubing extends in the opposite direction. Within the cutout 24, the tubing is curved and applied against the curved guide surface 36 to assure that the tubing is curved smoothly along a gradually curved path in order to avoid kinking and other problems. The tubing fits closely beneath the projecting ledge 40 as best shown in FIG. 12, and the ledge 40 thus holds the tubing in place temporarily while the tubing is strung throughout the room in all of the channels 20 and all of the cutouts 24 in the manner indicated. After the tubing has been strung throughout the room in this manner, it extends back downwardly through the subfloor 22 through an opening 86 formed in the subfloor near one end of the channel 22 located adjacent to the opposite end wall 14. The tubing then connects with a return manifold (not shown) which returns the heated fluid to the heating source so that it can be heated and pumped back through the system to the supply manifold 84.

The tubing 38 may be secured firmly in the channels 20 by one or more of the holding blocks 54. Preferably, the tubing is secured by a block 54 at a location near the opening 82 where the tubing extends upwardly through the subfloor and is turned into the first channel (see FIG. 10) and also near the other opening 86 where the tubing is turned back downwardly and extended through the subfloor again. As best shown in FIG. 9, the tubing is lifted slightly at the location where block 54 is to be applied, and the block is opened about the hinge axis 62 to allow it to be applied to the tubing 38 and into the semi-circular cavities 64a and 64b. The block may then be closed such that the tubing 38 fits closely in the passage 64, and the block 54 is installed in the channel 20 in a close fit therein as shown in FIG. 11. The block 54 may be secured by applying the screw 70 through hole 68 and into the underlying subfloor 22.

After the tubing has been threaded through the channels 20 and the cutout grooves 42 in the manner indicated, the header plates 32 are installed in the cutouts 24. This is accomplished in the manner shown in FIG. 12. The arcuate edge portion of the plate 32 is inserted into the cutout 24 against the tubing 38 with the plate 32 at an angle. A tool such as a mallet 88 can be used to force the straight edge portion of the plate 32 down into the cutout 24 with the straight edge portion of the plate 32 fitting closely against the adjacent edge of the sleeper 18. After the plate 32 is in place, a fastener such as a screw 90 (see FIG. 13) can be inserted through the predrilled hole 50 and installed into the subfloor 22 to secure the plate 32 in place. The tubing 38 is then securely held in the groove 42 underneath the ledge 40 and between surface 36 and the curved surface of the plate 32.

Heat conductive sheeting such as a plurality of thin aluminum panels 92 (FIG. 14) are then installed transversely to the sleepers 18 and cover the sleepers and the channels 20. Nails or screws or other fasteners are preferably used to secure the panels 92 to the sleepers 18. The panels 92 are preferably provided with a plurality of perforations 94 which provide visual access to the underlying structures so that fasteners are not inserted into the channels 20 where they could possibly puncture the tubing 38. It is preferred that the panels 92 not cover the header panels 16 in order to assure that fasteners are not driven into the curved radius portions of the tubing.

The undersides of the heat conductive sheeting panels 92 can be provided with a heat absorbing coating such as the type commonly known as a "selective surface". This coating is beneficial in that it causes the surfaces of the panels 92 that face the tubing to absorb increased energy which is then available to be conducted to the layers of the flooring above.

Suitable finish flooring 96 can then be applied over the panels 92, and virtually any type of finish flooring can be used. If additional support for the finished flooring is required, the channels 20 may be provided with C-shaped covers 98 (FIG. 9) which have opposite legs 98a extending along the opposite edges of the channel 20 and a flat top surface 98*b* extending between the top ends of the flanges or legs 98*a*. The upper surface of the top 98*b* should be flush with the top surface of the sleepers 18. In this manner, tubing 38 is covered by the C covers 98 to provided what is essentially an uninterrupted flat surface for application of the flooring material.

When heated fluid is pumped through the radiant tubing 38, the heat is transmitted through the tubing and radiates and reflects off of the surface of the tape 78 to the panels 92. The panels 92 conduct the heat to the overlying flooring 96 and then into the room above.

Because the channels 20 are considerably wider than the tubing 38, the tubing is able to thermally expand when the system is activated without rubbing against the sides of the channels 20. Thus, undesirable rubbing noises that have plagued other types of systems are avoided. Similarly, there is a clearance provided between the tubing 38 and the overlying panels 92 so that the tubing does not rub against the under sides of the panels when it thermally expands as the system is activated. The clearance distance is approximately the thickness of the ledge 40.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A heated floor construction, comprising:

a substantially horizontal support surface;

a plurality of sleeper elements on said surface presenting a plurality of channels spaced apart and substantially parallel to one another;

radiant heating tubing extending in said channels and receiving a thermal fluid for generating heat; and a header on said surface providing a curved path extending between adjacent channels and receiving a curved bend of said tubing to allow the tubing to extend between said adjacent channels.

2. A heated floor construction as set forth in claim 1, including a header plate secured to said support surface to hold said tubing on said curved path.

3. A heated floor construction as set forth in claim 1, wherein:

said header has an arcuate cutout; and said cutout presents a curved surface on said header that provides said curved path.

4. A heated floor construction as set forth in claim 3, including an arcuate header plate secured in said cutout in a manner to hold said tubing against said curved surface.

5. A heated floor construction as set forth in claim 1, including heat conductive sheeting covering said sleepers and channels.

6. A heated floor construction as set forth in claim 5, including a heat absorbing coating on said sheeting.

7. A heated floor construction as set forth in claim 5, wherein:

said channels have widths greater than a diameter of the tubing; and said sheeting is spaced above said tubing to allow the tubing to expand and contract in said channels without rubbing on said sheeting.

8. A heated floor construction as set forth in claim 1, including reflective tape in each channel on a bottom surface thereof.

9. A radiant heating system for installation on a floor, comprising:

a plurality of spaced apart sleeper elements for application to the floor to present a plurality of substantially parallel channels;

radiant heating tubing extending in said channels and receiving a heated fluid to apply heat;

a header for application to the floor, said header having an arcuate cutout presenting a curved path for the tubing between adjacent channels to allow the tubing to extend along said curved path between the adjacent channels; and a header plate for insertion into said cutout to substantially fill the cutout and hold the tubing on said curved path.

10. A system as set forth in claim 9, including heat conductive sheeting covering said sleepers and channels.

11. A system as set forth in claim 10, including a heat absorbing coating on said sheeting.

12. A system as set forth in claim 10, wherein:

said channels have widths greater than a diameter of the tubing; and said sheeting is spaced above said tubing to allow the tubing to expand and contract in said channels without rubbing on said sheeting.

13. A system as set forth in claim 9, wherein said cutout presents a curved surface which provides said curved path, said header plate holding the tubing against said curved surface when inserted into said cutout.

14. A system as set forth in claim 13, including a ledge overlying said curved surface to hold the tubing under the ledge and against said curved surface before said header plate is inserted into said cutout.

15. A system as set forth in claim 13, wherein said header plate is initially connected with said header by a detachable connection which can be detached to allow the tubing to be applied against said curved surface before the header plate is inserted into said cutout.

16. A system as set forth in claim 15, wherein said header plate substantially fills said cutout when detachably connected with said header.

17. A system as set forth in claim 16, including predrilled holes in said header and header plate for receiving fasteners securing the header and header plate to the floor.

18. A system as set forth in claim 15, including a prying surface on said header plate against which a tool can be applied to detach said detachable connection by prying action.

19. A system as set forth in claim 9, including reflective tape on a base of each channel reflective to infrared radiation.

20. A system as set forth in claim 9, including a generally C-shaped cover for each channel applicable therein and having legs in the channel and a top surface substantially flush with a top surface of each sleeper.

21. A system as set forth in claim 9, including at least one holding block for securing the tubing in a channel, said block having a size to fit closely in a channel and presenting a passage for receiving the tubing.

22. A system as set forth in claim 21, wherein said block has sections connected to pivot relative to one another to open and close said passage on the tubing.

23. A system as set forth in claim 21, including a beveled surface on said block and a predrilled hole extending into said beveled surface for receiving a fastener used to secure the block to the floor with the beveled surface receiving the fastener below top surfaces of said sleepers.

24. A method of installing a radiant heating system on a floor, comprising the steps of:
   installing on said floor a plurality of sleepers which provide generally parallel channels therebetween and a header having an arcuate cutout providing a curved path between ends of adjacent channels;
   extending a radiant heating tube through said channels and along said path;
   inserting a header plate into said cutout to hold said tubing in extension along said path; and
   covering said sleepers and channels with heat conductive sheeting.

25. A method as set forth in claim 24, wherein said header plate is initially in said cutout and has a detachable connection with said header, and including the step of detaching said header plate from said header prior to extending said tube along said path.

26. A method as set forth in claim 24, including t he step of applying reflective tape in each of said channels.

27. A method as set forth in claim 24, including the step of securing said tube in said channels at one or more selected locations.

28. A header construction for use in a radiant floor heating system having spaced apart sleepers providing channels in which radiant tubing containing heated fluid extends, comprising:
   a header body having an arcuate cutout presenting a curved surface located to extend between ends of adjacent channels to allow the tubing to extend along said curved surface between said adjacent channels in a smoothly curved radius bend; and
   a detachable header plate substantially filling said cutout and having a detachable connection with said header body to expose said cutout for insertion of the tubing therein along said curved surface, said header plate being applicable into said cutout in a close fit therein to hold the tubing against said curved surface.

29. A header construction as set forth in claim 28, including a ledge in each cutout projecting from said header body adjacent to said curved surface to hold the tubing against said surface before the header plate is applied into said cutout.

30. A header construction as set forth in claim 28, including a prying surface on said header plate arranged to receive a prying tool used to detach said detachable connection by prying force.

31. A header construction for use in a radiant floor heating system having spaced apart sleepers providing channels which receive radiant tubing containing heated fluid, comprising:
   a header body having a plurality of arcuate cutouts each presenting a curved surface, said curved surfaces being located to ex tend between ends of adjacent channels to provide curved paths along which the tubing can smoothly curve between adjacent channels; and
   a detachable header plate in each cutout having a detachable connection with said header body to expose each cutout when the corresponding header plate is detached, each header plate being applicable into a cutout in a close fit therein to hold the tubing against the curved surf ace of the cutout receiving the header plate.

* * * * *